US012611912B2

(12) United States Patent　　　(10) Patent No.:　US 12,611,912 B2
Gomi　　　　　　　　　　　　　　(45) Date of Patent:　　Apr. 28, 2026

(54) INFORMATION PROCESSING DEVICE

(71) Applicant: TOYOTA JIDOSHA KABUSHIKI KAISHA, Toyota (JP)

(72) Inventor: Reona Gomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 18/469,877

(22) Filed: Sep. 19, 2023

(65) Prior Publication Data

US 2024/0208295 A1　　Jun. 27, 2024

(30) Foreign Application Priority Data

Dec. 22, 2022　(JP) ................................. 2022-205892

(51) Int. Cl.
| | |
|---|---|
| B60H 1/00 | (2006.01) |
| B60Q 9/00 | (2006.01) |
| E05F 15/70 | (2015.01) |
| G06V 20/59 | (2022.01) |
| G10L 15/22 | (2006.01) |
| B60H 3/00 | (2006.01) |
| B60N 2/90 | (2018.01) |

(52) U.S. Cl.
CPC ........... B60H 1/00742 (2013.01); B60Q 9/00 (2013.01); E05F 15/70 (2015.01); G06V 20/597 (2022.01); G10L 15/22 (2013.01); B60H 3/0007 (2013.01); B60N 2/90 (2018.02); B60N 2002/981 (2018.02); E05Y 2900/55 (2013.01)

(58) Field of Classification Search
CPC ............ B60H 1/00742; B60H 1/00971; B60H 3/0007; B60Q 9/00; B60N 2/90; B60N 2002/981; B60R 16/037; B60R 16/0973; E05F 15/70; E05Y 2900/55; E05Y 2800/75; G06V 20/597; G10L 15/22; G10L 25/63

See application file for complete search history.

(56) References Cited

U.S. PATENT DOCUMENTS

| | | | | |
|---|---|---|---|---|
| 5,813,989 A * | 9/1998 | Saitoh | ................ | B60H 1/00742 |
| | | | | 340/576 |
| 5,867,587 A * | 2/1999 | Aboutalib | .............. | G08B 21/06 |
| | | | | 340/576 |
| 9,055,509 B2 * | 6/2015 | Macek | ................... | H04L 51/043 |
| 9,821,657 B2 * | 11/2017 | Gan | ....................... | G08B 21/06 |
| 10,618,522 B2 * | 4/2020 | Liu | ....................... | B60W 40/08 |
| 10,759,440 B2 * | 9/2020 | Choo | .................... | B60W 40/09 |
| 11,260,879 B2 * | 3/2022 | Lee | ....................... | B60W 40/08 |
| 11,554,781 B2 * | 1/2023 | Tamilarasan | .......... | G06V 40/18 |

(Continued)

FOREIGN PATENT DOCUMENTS

| | | |
|---|---|---|
| JP | 2005-049773 A | 2/2005 |
| JP | 2016-206469 A | 12/2016 |

(Continued)

*Primary Examiner* — Logan M Kraft
*Assistant Examiner* — Sherman D Manley
(74) *Attorney, Agent, or Firm* — SoraIP, Inc.

(57) ABSTRACT

An information processing device including a control unit, wherein the control unit estimates a state of a user based on user information including at least one of voice data, image data, or biometric data of a user of the vehicle, and when it is determined that the estimated state satisfies a predetermined condition, executes a predetermined process selected in accordance with the estimated state in the vehicle.

5 Claims, 4 Drawing Sheets

(56) References Cited

U.S. PATENT DOCUMENTS

| | | | | |
|---|---|---|---|---|
| 12,280,764 B2 * | 4/2025 | Jung | G06V 40/103 | |
| 2003/0096593 A1 * | 5/2003 | Naboulsi | G08B 21/06 | |
| | | | | 455/565 |
| 2003/0096594 A1 * | 5/2003 | Naboulsi | G08B 21/06 | |
| | | | | 340/576 |
| 2006/0012679 A1 * | 1/2006 | Ressler | G08B 13/1961 | |
| | | | | 348/148 |
| 2006/0235753 A1 * | 10/2006 | Kameyama | G06Q 30/0201 | |
| | | | | 705/15 |
| 2007/0192038 A1 * | 8/2007 | Kameyama | G06F 16/436 | |
| | | | | 707/E17.143 |
| 2008/0212828 A1 * | 9/2008 | Ishida | G06V 40/20 | |
| | | | | 382/100 |
| 2008/0218359 A1 * | 9/2008 | Ishida | G06V 40/171 | |
| | | | | 340/575 |
| 2010/0234747 A1 * | 9/2010 | Hatakeyama | A61B 5/4806 | |
| | | | | 600/509 |
| 2014/0172467 A1 * | 6/2014 | He | G06Q 40/08 | |
| | | | | 705/4 |
| 2015/0314681 A1 * | 11/2015 | Riley, Sr. | A61B 5/7455 | |
| | | | | 340/576 |
| 2016/0001781 A1 * | 1/2016 | Fung | G07C 9/37 | |
| | | | | 701/36 |
| 2017/0097243 A1 * | 4/2017 | Ricci | G08B 25/016 | |
| 2018/0033280 A1 * | 2/2018 | Taylor | G06V 40/166 | |
| 2019/0357834 A1 * | 11/2019 | Aarts | A61B 5/7246 | |
| 2020/0219485 A1 * | 7/2020 | Chen | G10L 15/08 | |
| 2022/0332340 A1 * | 10/2022 | Gossele | H04W 4/40 | |

FOREIGN PATENT DOCUMENTS

| | | |
|---|---|---|
| JP | 2022-165339 A | 10/2022 |
| JP | 2022-179108 A | 12/2022 |

* cited by examiner

10

100    VEHICLE

300

200    INFORMATION PROCESSING DEVICE

VEHICLE ~100

COMMUNICATION UNIT ~101

ACQUISITION UNIT ~102

IMAGING UNIT ~103

AGENT ~104

SPRAY MECHANISM ~105

AUDIO DEVICE ~106

AIR CONDITIONER ~107

WINDOW OPENING AND SHUTTING DEVICE ~108

SEAT VIBRATION DEVICE ~109

OUTPUT UNIT ~110

INPUT UNIT ~111

STORAGE UNIT ~112

CONTROL UNIT ~113

INFORMATION PROCESSING DEVICE

CROSS-REFERENCE TO RELATED APPLICATION

This application claims priority to Japanese Patent Application No. 2022-205892 filed on Dec. 22, 2022, incorporated herein by reference in its entirety.

BACKGROUND

1. Technical Field

The present disclosure relates to an information processing device.

2. Description of Related Art

Hitherto, there is known a technology related to an agent system for a vehicle. For example, Japanese Unexamined Patent Application Publication No. 2022-165339 (JP 2022-165339 A) discloses an agent device that presents, in response to voice information from an occupant in a vehicle, response information associated with the voice information.

SUMMARY

The related-art agent system for the vehicle has room for improvement in terms of user experience.

In view of such circumstances, an object of the present disclosure is to improve a technology related to an agent system for a vehicle.

An information processing device according to an embodiment of the present disclosure includes a control unit. The control unit is configured to estimate a state of a user of a vehicle based on user information including at least one of voice data, image data, and biometric data of the user, and when determination is made that the estimated state satisfies a predetermined condition, execute a predetermined process selected based on the estimated state in the vehicle.

According to the embodiment of the present disclosure, the technology related to the agent system for the vehicle is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
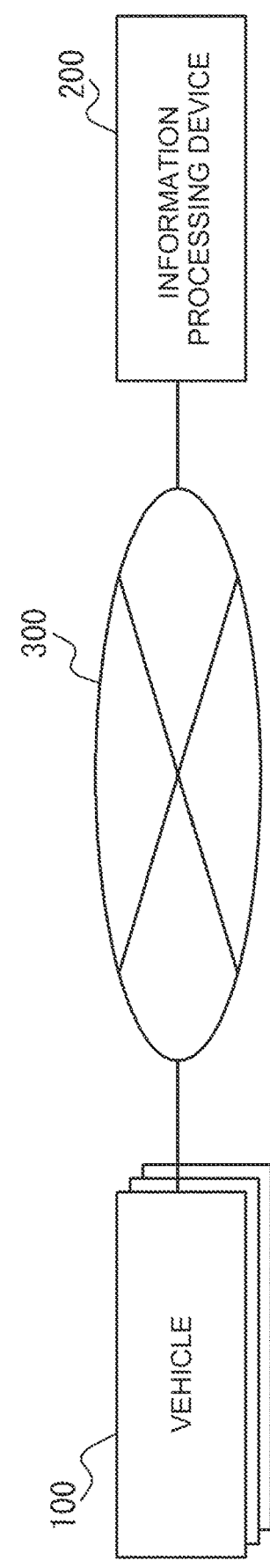
FIG. 1 is a block diagram illustrating a schematic configuration of a system according to an embodiment of the present disclosure.

The outline of a system 10 according to an embodiment of the present disclosure will be described with reference to FIG. 1. The system 10 includes a vehicle 100 and an information processing device 200. The vehicle 100 and the information processing device 200 are communicably connected to a network 300 including, for example, the Internet and a mobile communication network.

The vehicle 100 is, for example, an automobile, but is not limited thereto, and may be any vehicle. The motor vehicle is any type of motor vehicle, such as, for example, a gasoline-powered vehicle, a diesel-powered vehicle, a hybrid electric vehicle (HEV), a plug-in hybrid electric vehicle (PHEV), a battery electric vehicle (BEV), or a fuel cell electric vehicle (FCEV). The vehicle 100 is driven by a driver in the present embodiment, but the driving may be automated at an arbitrary level. The level of automation is, for example, any of level 1 to level 5 in the level division of Society of Automotive Engineers (SAE). Vehicle 100 may be a Mobility as a Service (MaaS) dedicated vehicle. The number of vehicles 100 included in the system 10 may be arbitrarily determined.

In the present embodiment, the vehicle 100 has a function of acquiring data (hereinafter, also referred to as "voice data") related to the voice of the user riding on the vehicle 100. The vehicle 100 has a function of acquiring an image or a video (hereinafter, also referred to as "image data") on which a state in the vehicle including a body motion other than an expression and an expression of the user while riding in the vehicle is captured. The vehicle 100 has a function of acquiring data (hereinafter, also referred to as "biological data") indicating a biological state such as heart rate fluctuation, heat radiation amount, or respiration of a user who is riding. The biometric data may be obtained from a biometric sensor, such as a vein sensor attached at any location within the vehicle 100, or may be obtained from a wearable device, such as a wristwatch-type device or a clothing-type device, wearable at any location on the user's body or clothing. The vehicle 100 has a function of acquiring data (hereinafter, also referred to as "travel data") that changes as the vehicle 100 travels, such as the position of the vehicle 100, the vehicle speed, the acceleration, the shift position, the ignition ON, the ignition OFF, or the travel distance. The vehicle 100 has a function of storing and/or transmitting the acquired data.

The information processing device 200 is installed in a facility such as a data center. The information processing device 200 is, for example, a computer such as a server device belonging to a cloud computing system or another computing system. The information processing device 200 is capable of communicating with the vehicle 100 via the network 300. The information processing device 200 can acquire, from each vehicle, any data relating to a user riding on the vehicle and/or the vehicle itself, including voice data, image data, biometric data, and/or travel data.

In the present embodiment, the system 10 is used in a vehicular agent system.

First, the outline of the present embodiment will be described, and the details will be described later. The information processing device 200 estimates the state of the user based on the user information including at least one of the voice data, the image data, and the biometric data of the user of the vehicle 100. When it is determined that the estimated state satisfies the predetermined condition, the information processing device 200 executes a predetermined process selected according to the estimated state in the vehicle 100.

As described above, according to the present embodiment, by estimating the state of the user of the vehicle 100, predetermined processing can be actively executed without waiting for an instruction from the user. For example, if it is estimated that the user is in a stress or drowsy state, the in-vehicle environment of the vehicle 100 may be changed so as to cancel the state, and a process of mitigating adverse effects on the steering may be actively performed. Therefore, it is possible to provide a highly satisfactory mobile experience to a user who feels insufficient in the conventional passive vehicle agent service. Therefore, the technology related to the vehicular agent system is improved in that the user experience is easily improved.

Next, each configuration of the system 10 will be described in detail.

Configuration of Vehicle

Figure 2:
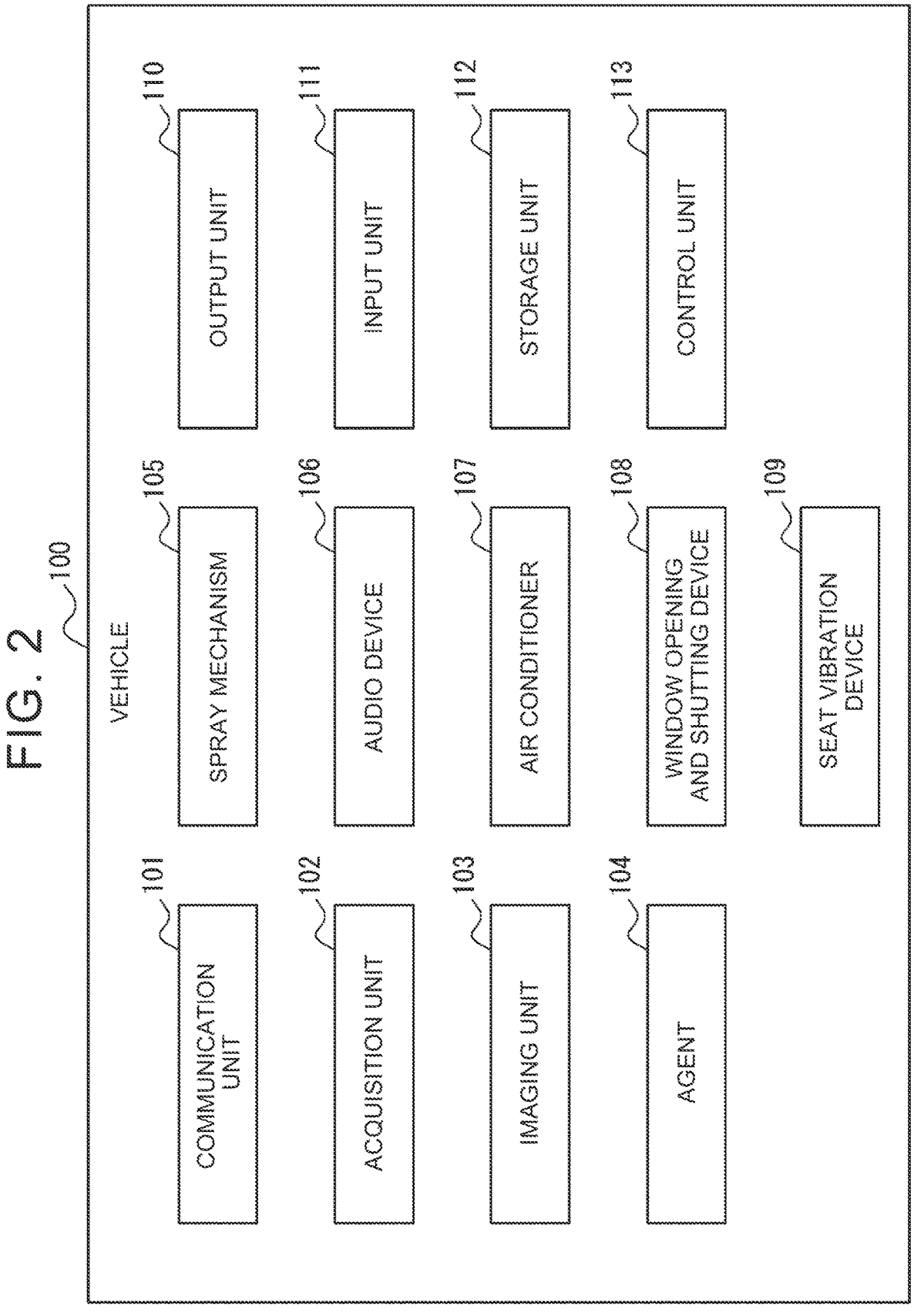
FIG. 2 is a block diagram illustrating a schematic configuration of a vehicle.

As illustrated in FIG. 2, the vehicle 100 includes a communication unit 101, an acquisition unit 102, an imaging unit 103, an agent 104, a spraying mechanism 105, an audio device 106, an air conditioner 107, a window opening/closing device 108, a seat vibration device 109, an output unit 110, an input unit 111, a storage unit 112, and a control unit 113.

The communication unit 101 includes one or more communication interfaces connected to the network 300. The communication interfaces correspond to mobile communication standards such as 4th Generation (4G) or 5th Generation (5G), for example, but are not limited thereto. In the present embodiment, the vehicle 100 communicates with the information processing device 200 via the communication unit 101 and the network 300.

The acquisition unit 102 includes a first sensor module capable of acquiring travel data of the vehicle 100. For example, the first sensor module may include one or more devices for obtaining location information of the vehicle 100. Specifically, the first sensor module may include, but is not limited to, a receiver corresponding to, for example, Global Positioning System (GPS), a receiver corresponding to any satellite-positioning system. In addition, the first sensor module includes a range sensor such as a speed sensor, an acceleration sensor, an angular velocity sensor, a geomagnetic sensor, or a light detection and ranging (Li-DAR), a temperature/humidity sensor, or a combination thereof. The vehicle 100 may acquire travel data of the vehicle 100 using the first sensor module of the acquisition unit 102.

Further, the acquisition unit 102 includes a second sensor module capable of acquiring biometric data of a user riding on the vehicle 100. For example, the second sensor module may include a vein sensor, a fingerprint sensor, a voice print sensor, an infrared sensor, a respiration sensor, or a combination thereof. The vein sensor may be any sensor capable of detecting a pattern of a user's vein. The fingerprint sensor may be any sensor capable of reading a pattern of a user's fingerprint. The voiceprint sensor may be any sensor capable of reading a pattern of a user's voiceprint. The infrared sensor may be any infrared sensor capable of measuring the amount of heat dissipated by the user over time. The breathing sensor may be any sensor capable of measuring a user's breathing cycle over time. The vehicle 100 may acquire biometric data of each user using the second sensor module of the acquisition unit 102. The acquired biometric data can be used for user authentication by a well-known method such as pattern matching.

The imaging unit 103 includes one or more cameras. Each camera included in the imaging unit 103 may be provided in the vehicle 100 so as to be able to capture an image of a subject inside or outside the vehicle, for example. In the present embodiment, the imaging unit 103 includes an in-vehicle camera capable of capturing an image of a subject inside the vehicle 100. The imaging unit 103 is not limited to this, and may include, for example, a front camera and a rear camera capable of capturing an image of a subject in front of and behind the vehicle 100, or an omnidirectional camera capable of capturing an image of a subject in the vicinity of the vehicle 100. Further, the imaging unit 103 may include an input interface capable of communicating with a camera such as a drive recorder installed in the vehicle 100 so as to be capable of capturing an image of an object inside or outside the vehicle, and may be capable of acquiring an image of each user riding on the vehicle 100 from the camera. In the present embodiment, the vehicle 100 may acquire image data of each user using the imaging unit 103. The acquired image data can be used for user authentication by a well-known method such as pattern matching, or for state analysis of each user riding on the vehicle.

The agent 104 is an Electronic Control Unit (ECU) comprising a computer incorporating voice interaction software that performs voice recognition and analysis of the user of the vehicle 100 and generates queries or answers to the user. The voice interaction software includes, for example, a voice interaction artificial intelligence (AI). The agent 104 may be used to interpret the utterance content or generate a response or a question by holding an interaction history. In the present embodiment, the agent 104 is configured to be capable of performing a conversation with a user, which will be described later. The vehicle 100 may use the agent 104 to execute a process of speaking to the user according to an utterance mode executable by the agent 104 (hereinafter, also referred to as "speaking to the user").

The spraying mechanism 105 is an arbitrary mechanism installed at an arbitrary position in the vehicle 100 and capable of spraying fragrance into the vehicle interior of the vehicle 100. Spray mechanism 105 includes one or more outlets. The vehicle 100 may perform a process of spraying an arbitrary amount and concentration of fragrance in the vehicle interior of the vehicle 100 (hereinafter, also referred to as "fragrance spray") using the spraying mechanism 105. In the present embodiment, the fragrance is a so-called functional fragrance in which effects such as "relaxing" or "enhancing concentration" are expected. For example, fragrances include any system of fragrances, such as floral fragrances, which are expected to have the effect of relaxing a person, or citrus fragrances, which are expected to have the effect of increasing the concentration of a person or of waking a person.

The audio device 106 is any device such as a music player that generates an audio signal based on audio data. The acoustic data is provided to the audio device 106, for example by means of a storage medium or broadcast or via the network 300. The audio device 106 may include one or more of a CD player, DVD player, blue-ray player, hard disk drive, AM tuner, FM tuner, TV tuner, or audio decoder. The vehicle 100 can execute a process (hereinafter, also referred to as "music reproduction") of allowing a user to view any music content or broadcast output from a speaker as an output unit 110, which will be described later, using the audio device 106.

The air conditioner 107 is any device having a function of sensing and adjusting the temperature and humidity in the vehicle interior of the vehicle 100. The air conditioner 107 includes one or more air outlets. Each air outlet may be provided in the vehicle 100 so as to apply air to an arbitrary user in the vehicle, for example. The vehicle 100 can perform a process (hereinafter, also referred to as "air-conditioning adjustment") of adjusting the air direction and the air blowing intensity of each air blowing port by adjusting the inside of the vehicle 100 to an arbitrary temperature and humidity using the air-conditioner 107.

The window opening and closing device 108 is any device having a function of controlling opening and closing of each window of the vehicle 100. The vehicle 100 can execute a process of opening and closing an arbitrary window of the vehicle 100 at an arbitrary width (hereinafter, also referred to as "window opening and closing") using the window opening and closing device 108.

The seat vibration device 109 is any device having a function of controlling vibration of each seat of the vehicle 100. The seat vibration device 109 can vibrate any seat of the vehicle 100 at any strength. For example, a diaphragm may be embedded in the backrest, the seat surface, or both of each seat. The vehicle 100 can perform processing (hereinafter, also referred to as "seat vibration") of vibrating an arbitrary seat at an arbitrary strength by vibrating any diaphragm of each seat using the seat vibration device 109. The seat vibration device 109 may have a massage function.

The output unit 110 may include one or more output devices that output information to notify the user. The output device is, for example, a speaker that outputs information by sound, a display that outputs information by video, or the like, but is not limited thereto. The output unit 110 may include an interface for connecting an external output device. The output unit 110 can be used for music reproduction using the audio device 106 of the present embodiment.

The input unit 111 includes one or more input devices that detect user input. In the present embodiment, the input unit 111 includes a microphone that receives an input of a sound emitted by the user and a sound inside the vehicle 100. However, the input device is not limited to these examples, and may include, for example, a physical key, a capacitive key, a touch screen integrally provided with a display, or the like. The input unit 111 may include an interface for connecting an external input device. In the present embodiment, the vehicle 100 may acquire voice data of each user using the input unit 111. The acquired voice data can be used for user authentication using well-known techniques such as pattern matching, or for state analysis of each user riding on the vehicle.

The storage unit 112 includes one or more memories. The memories are, for example, a semiconductor memory, a magnetic memory, or an optical memory, but are not limited to these memories. Each memory included in the storage unit 112 may serve as, for example, a main storage device, an auxiliary storage device, or a cache storage device. The storage unit 112 stores arbitrary information used for the operation of the vehicle 100. For example, the storage unit 112 may store a system program, an application program, embedded software, map information, and the like. The information stored in the storage unit 112 may be updatable by, for example, information acquired from the network 300 via the communication unit 101.

In the present embodiment, the storage unit 112 may store data acquired in the vehicle 100, that is, audio data, image data, biometric data, and travel data. In addition, the storage unit 112 may store a usage history (identification information of an execution function, a time stamp of an execution time, and the like) of elements such as the spraying mechanism 105 and the audio device 106 in association with a user.

The control unit 113 may include one or more processors, one or more programmable circuits, one or more dedicated circuits, or a combination thereof. The processor may be, but is not limited to, a general-purpose processor such as, for example, Central Processing Unit (CPU) or Graphics Processing Unit (GPU), or a special-purpose processor specialized for a particular process. The programmable circuitry is, for example, but not limited to, Field-Programmable Gate Array (FPGA). The dedicated circuitry is, for example, but not limited to, Application Specific Integrated Circuit (ASIC). The control unit 113 controls the overall operation of the vehicle 100.

In the present embodiment, the control unit 113 transmits voice data, image data, biometric data, and/or travel data to the information processing device 200 via the communication unit 101 and the network 300. Further, the control unit 113 receives, from the information processing device 200, data (hereinafter, also referred to as "instruction data") including an instruction to execute predetermined processing in the vehicle 100 and a designation of a detailed function. The control unit 113 may execute predetermined processing in the vehicle 100 using at least one element of the agent 104, the audio device 106, the spraying mechanism 105, the air conditioner 107, the window opening/closing device 108, or the seat vibration device 109 according to the instruction data.

Configuration of Information Processing Device

Figure 3:
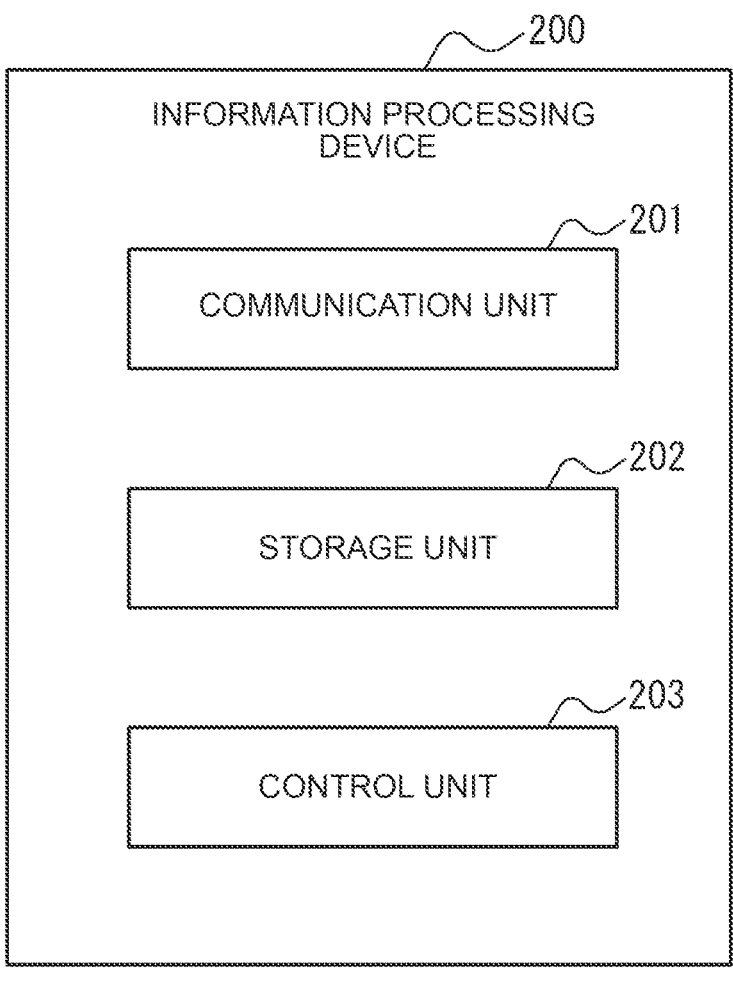
FIG. 3 is a block-diagram illustrating a schematic configuration of an information processing device.

As illustrated in FIG. 3, the information processing device 200 includes a communication unit 201, a storage unit 202, and a control unit 203.

The communication unit 201 includes one or more communication interfaces connected to the network 300. The communication interfaces correspond to, for example, a mobile communication standard, a wired Local Area Network (LAN) standard, or a radio LAN standard, but are not limited thereto, and may correspond to any communication standard. In the present embodiment, the information processing device 200 communicates with the vehicle 100 via the communication unit 201 and the network 300.

The storage unit 202 includes one or more memories. Each memory included in the storage unit 202 may function as, for example, a main storage device, an auxiliary storage device, or a cache memory. The storage unit 202 stores arbitrary information used for the operation of the information processing device 200. For example, the storage unit 202 may store a system program, an application program, a database, map information, and the like. The information stored in the storage unit 202 may be updatable by, for example, information acquired from the network 300 via the communication unit 201.

The control unit 203 may include one or more processors, one or more programmable circuits, one or more dedicated circuits, or a combination thereof. The control unit 203 controls the overall operation of the information processing device 200.

In the present embodiment, the control unit 203 receives voice data, image data, biometric data, and/or travel data of each vehicle 100 from the communication unit 101 of the vehicle 100 via the communication unit 201 and the network 300. The control unit 203 estimates the state of the user based on the received data, and generates instruction data. The control unit 203 may transmit instruction data to the communication unit 101 of the vehicle 100 via the communication unit 201 and the network 300 to cause the vehicle 100 to execute predetermined processing. The control unit 203 realizes the vehicular agent service of the present embodiment by causing the vehicle 100 to execute predetermined processing in accordance with the instruction data.

Operation Flow of Information Processing Device

Figure 4:
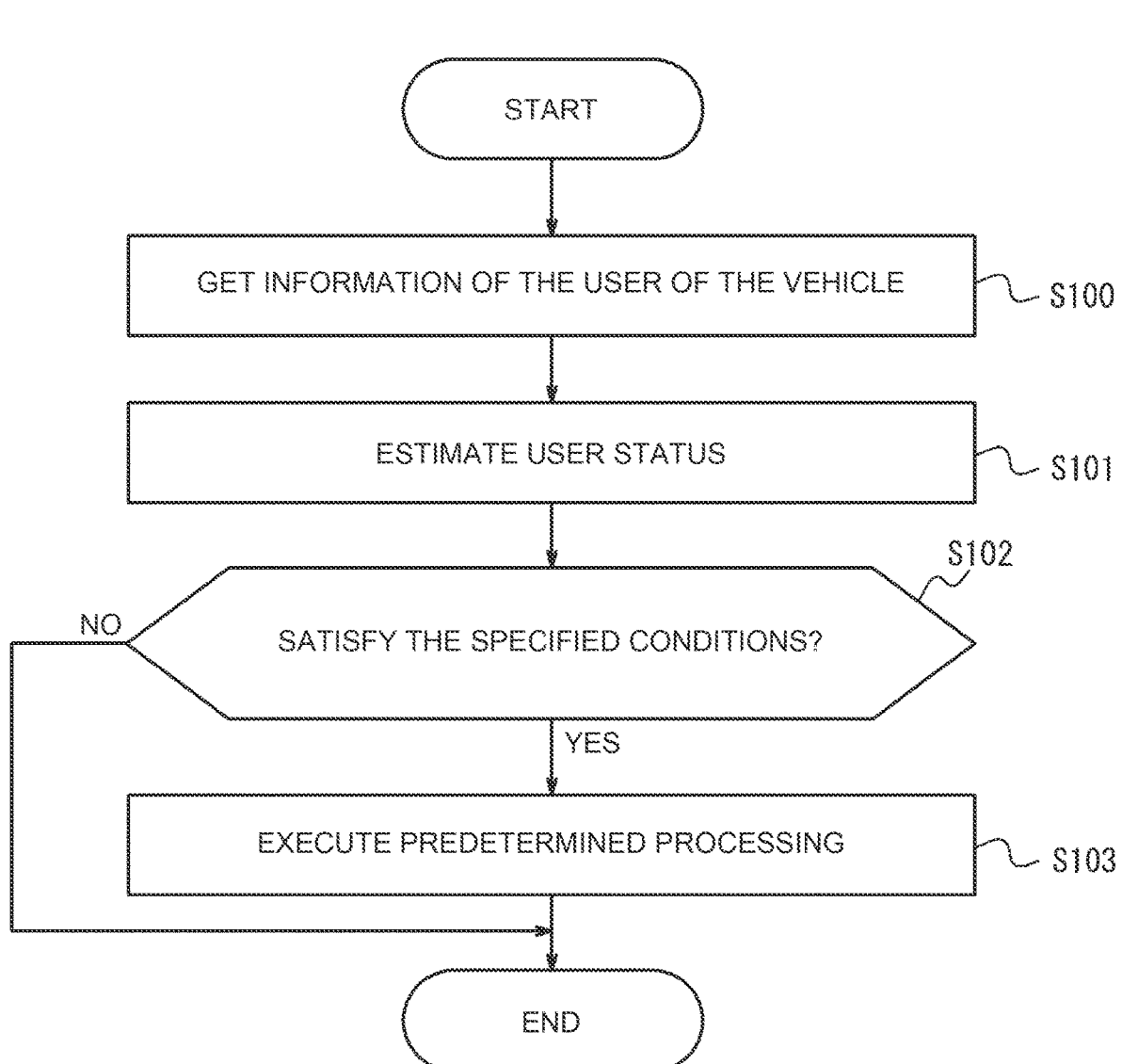
FIG. 4 is a flow chart illustrating an operation of information processing device.

An operation of the information processing device 200 according to the present embodiment will be described with reference to FIG. 4. The operation in FIG. 4 corresponds to the method according to the present embodiment. In the present embodiment, the operation of FIG. 4 is started in response to the ignition ON of the vehicle 100 being detected, and is repeatedly executed at an arbitrarily settable predetermined cycle. However, the condition or timing for starting the present operation is not limited to this example. Although the number of users of the vehicle 100 may be singular or plural, unless otherwise specified, the user of the vehicle 100 is assumed to be only a driver seated in the driver's seat.

S100

The control unit 203 of the information processing device 200 acquires user information including at least one of voice data, image data, and biometric data of the user of the vehicle 100.

Specifically, the control unit 203 acquires the user information by receiving at least one of the voice data, the image data, or the biometric data acquired by the vehicle 100 during a predetermined aggregation period from the communication unit 101 of the vehicle 100 via the communication unit 201 and the network 300. The predetermined aggregation period may be arbitrarily determined, but may be, for example, one minute.

S101

The control unit 203 estimates the state of the user based on the user information. The state of the user may include any state of the user that may adversely affect the in-vehicle environment or maneuvering of the vehicle 100. In the present embodiment, the state of the user refers to the strength of the stress or sleepiness of the user.

Specifically, the control unit 203 analyzes the voice data, the image data, or the biometric data included in the user information to determine the stress or the strength of the sleepiness of the user, thereby estimating the state of the user in the counting period. The intensity of the stress or the drowsiness of the user can be determined by any method, but in the present embodiment, the intensity of the stress is determined based on a stress score that is an evaluation index of the intensity of the stress or a drowsiness score that is an evaluation index of the intensity of the drowsiness. Both the stress score and the drowsiness score are represented by numerical values (e.g., integers equal to or greater than 0) in the present embodiment, but the present disclosure is not limited thereto. The higher the value of the stress score, the stronger the stress of the user. The higher the value of the sleepiness score, the stronger the sleepiness of the user. The control unit 203 calculates, for each of the acquired voice data, image data, or biometric data, the cumulative value of the stress score (hereinafter, also referred to as "cumulative stress score") and the cumulative value of the drowsiness score (hereinafter, also referred to as "cumulative drowsiness score") in the counting period. Specific examples are shown below for each type of data. It should be noted that any method can be adopted for calculating the cumulative stress score and the cumulative drowsiness score, and known stress and drowsiness estimation methods can be adopted in addition to or in place of the following specific examples.

In the case of the voice data, the control unit 203 may calculate the cumulative stress score and the cumulative drowsiness score of the voice data in the counting period by extracting and analyzing the voice information of the user from the acquired voice data. Specifically, the control unit 203 may calculate the cumulative stress score or the cumulative drowsiness score by extracting speech information such as speech content, sound pressure, or tone of the user from the speech data, performing speech recognition processing, and performing pattern matching. In this case, for example, a typical keyword or phrase generated when a person feels stress or drowsiness may be registered in the storage unit 202, and the higher the detection frequency thereof by pattern matching, the higher the numerical value of the score may be calculated.

In the case of the image data, the control unit 203 extracts and analyzes the image information of the user from the acquired image data, thereby calculating the cumulative stress score and the cumulative drowsiness score of the image data in the counting period. For example, the control unit 203 may calculate the cumulative stress score or the cumulative drowsiness score by extracting image information such as a user's facial expression or body motion from the image data, performing image recognition processing, and performing pattern matching. In this case, for example, typical expressions or body movements that are displayed when a person feels stress or drowsiness may be registered in the storage unit 202, and the higher the detection frequency thereof by pattern matching, the higher the numerical value of the score may be calculated. Examples include facial expressions or body movements such as wrinkling in the glabella, striking the steering with a finger, yawning, or reducing the opening and closing width of the eyelid. In this case, the cumulative value may be calculated to be higher as the duration of such an expression or body motion is longer.

In the case of biometric data, the control unit 203 may calculate the cumulative stress score and the cumulative drowsiness score of the biometric data in the counting period by extracting and analyzing biometric information such as heart rate variation, heat radiation amount, or respiration of the user from the acquired biometric data. For example, the control unit 203 may calculate a numerical value of the stress score based on low frequency (LF)/high frequency (HF) of the heart rate variability of the user. In this case, the higher LF/HF ratio, the higher the numerical value of the stress score may be calculated. Further, for example, the control unit 203 may calculate the numerical value of the drowsiness score based on the amount of heat dissipation of the user. In this case, the higher the amount of heat dissipation by the user, the higher the numerical value of the sleepiness score may be calculated.

The voice data, the image data, and the biometric data may be individually analyzed, but it is desirable to analyze two or more arbitrary combinations from the viewpoint of improving the estimation accuracy of the state of the user. Specifically, the control unit 203 calculates a score obtained by summing the cumulative stress scores of the various data (hereinafter, also referred to as "total stress score") and a score obtained by summing the cumulative sleepiness scores of the various data (hereinafter, also referred to as "total sleepiness score") for each aggregation period. That is, one total stress score and one total drowsiness score are calculated for each aggregation period.

Based on the total stress score and the total drowsiness score calculated in this manner, the control unit 203 determines the stress level and the drowsiness level of the user in the counting period. In the present embodiment, the stress level and the drowsiness level are indices for evaluating the strength of the stress and the drowsiness of the user, respectively, and are indicated by, for example, five grades of level 1 to level 5. The higher the grade, the stronger the stress or sleepiness of the user. However, the evaluation index is not limited to this example. The association between the score and the grade can be arbitrarily set. The control unit 203 determines a stress level and a drowsiness level of the user in the aggregation period based on the total stress score and the total drowsiness score.

Based on the stress level and the drowsiness level determined in this manner, the control unit 203 may estimate the state of the user (here, whether the user is in a stress or drowsiness state) in each aggregation period. For example, when the stress level or the drowsiness level is equal to or higher than the level 4, the control unit 203 may estimate that the user is in a state of strong stress or drowsiness during the aggregation period. When the stress level or the drowsiness level is equal to or lower than the level 3, the control unit 203 may estimate that the user is not in a stress or drowsiness state during the aggregation period.

S102

The control unit 203 determines whether or not the estimated state satisfies a predetermined condition. When the control unit 203 determines that the predetermined condition is satisfied (S102—Yes), the processing proceeds to S103. On the other hand, when the control unit 203 determines that the predetermined condition is not satisfied (S102—No), the processing is terminated.

The predetermined condition can be arbitrarily set, but in the present embodiment, the user is in a stress or drowsy state. Specifically, the stress level or the sleepiness level of the user in the aggregation period is equal to or higher than a predetermined level (level 4 in the present example). When the stress level or the drowsiness level determined by S101 is equal to or higher than the level 4, the control unit 203 estimates that the user is in a strong stress or drowsiness state during the aggregation period. In this case, the control unit 203 may determine that the user state satisfies a predetermined condition.

S103

When the control unit 203 determines that the estimated state satisfies the predetermined condition (S102—Yes), the control unit 203 executes a predetermined process selected according to the estimated state in the vehicle 100.

Specifically, the control unit 203 selects, from among the candidates ("processing candidates") of processing that can be executed by the vehicle 100, a processing that can mitigate an adverse effect on the steering by changing the in-vehicle environment of the vehicle 100 so as to cancel the state ("user state") of the user determined to satisfy the predetermined condition. As the processing candidate, any processing can be set, but in the present embodiment, fragrance spraying, music reproduction, air-conditioning adjustment, window opening/closing, seat vibration, and conversation to the user in the vehicle 100 are set. The control unit 203 selects at least one of these processing candidates as the predetermined processing of the present embodiment.

For example, when it is detected in S102 that the stress level becomes equal to or higher than the predetermined level, it is estimated that the user is in a stress-intensive condition during the aggregation period. In this case, the control unit 203 may select fragrance spraying, music playback, and speech to the user as at least one process, e.g., in the vehicle 100, in order to change the user state (here, strong stress) to cancel out.

Further, for example, when it is detected in S102 that the sleepiness level becomes equal to or higher than the predetermined level, it is estimated that the user is in a state of strong sleepiness during the aggregation period. In this case, the control unit 203 may select, for example, fragrance spraying, music reproduction, air-conditioning adjustment, window opening/closing, seat vibration, and talking to the user as at least one process in order to change the user state (here, strong sleepiness) to cancel out.

Then, the control unit 203 designates a detailed function of at least one selected process. In the case of music reproduction, the control unit 203 designates, for example, music content or volume to be reproduced. In the case of air-conditioning adjustment, the control unit 203 designates, for example, temperature and humidity, an air outlet, an air direction, or an air blowing intensity. In the case of window opening/closing, the control unit 203 designates, for example, which window (a window of the driver's seat, a window other than the driver's seat, or both) of the vehicle 100 is to be opened/closed (opening/closing width, etc.). In the case of seat vibration, the control unit 203 designates, for example, which seat (a driver's seat, a seat other than the driver's seat, or both) is to be vibrated (vibration intensity, etc.). In the case of speaking to the user, the control unit 203 designates, for example, an utterance mode (described later) of the speaking.

Further, when selecting at least one process, information indicating a user's preference (hereinafter, also referred to as "preference information") may be considered. The preference information can be acquired by any method. For example, the preference information may be generated based on a usage history of elements such as the spraying mechanism 105 and the audio device 106 of the vehicle 100, feedback information indicating an evaluation result of the user obtained at an arbitrary timing after execution of each process, or both. The preference information includes, for example, information indicating a user's fragrance or a preference of music content. The control unit 203 can acquire the preference information by receiving the preference information stored in the storage unit 112 of the vehicle 100 from the vehicle 100 via the network 300. The preference information may be stored in the storage unit 202. The control unit 203 can determine the preference of the user by reading the preference information of the user from the storage unit 202. For example, if the control unit 203 determines that the user does not like a certain kind of fragrance, the control unit 203 may exclude the fragrance spray of the fragrance from the processing candidate. That is, the control unit 203 may invalidate one or more of the processing candidates in relation to the user based on the preference information of the user. This may prevent the user's unfavorable fragrance from being sprayed on the vehicle 100 even when it is detected that the sleepiness level becomes equal to or higher than the predetermined level in S102, for example. As a result, the user of the vehicle 100 can easily provide a highly satisfactory travel experience. Note that the user of the vehicle 100 can be specified by user authentication using voice data, image data, or biometric data.

Additionally or alternatively, machine learning, such as deep learning, may be used to select at least one process. For example, it is assumed that the user U1 is gradually relaxed when the fragrance X is sprayed in the vehicle, although it is estimated that the transition of the biometric data (for example, LF/HF rate) of a certain user U1 is stressful in a certain aggregation period P1. In such a case, the learned model can be generated by performing machine learning on the information in which the user, the transition of the biometric data, and the actually executed processing are associated with each other as the teacher data. By inputting processing candidates into the generated learned model, it is possible to determine whether the processing candidates are effective in mitigating adverse effects on maneuvering in relation to the user and the user state.

Then, the control unit 203 transmits, to the communication unit 101 of the vehicle 100 via the communication unit 201 and the network 300, an instruction for executing at least one process selected as described above, including the instruction data together with the designation of the corresponding detailed function. The control unit 113 of the vehicle 100 performs at least one process and a corresponding detailed function indicated by the received instruction data in the vehicle 100. In this way, the control unit 203 can execute a predetermined process selected according to the estimated state in the vehicle 100.

Although the case where the number of users of the vehicle 100 is singular has been described for the sake of convenience, the number of users of the vehicle 100 may be plural. In this case, if a predetermined process is selected based only on the user state of the user who is the driver, an undesirable process may be executed depending on the user state of the user who is the passenger. Therefore, in order to easily prevent such a situation, when the number of users of the vehicle 100 is plural, the control unit 203 may select at least one process for each user according to a state estimated for each user.

Specifically, the control unit 203 determines whether each user is a driver or a passenger based on the position of the seat of the vehicle 100 on which the user is seated. After identifying the driver and the passenger, the control unit 203 determines whether or not each processing candidate is valid for the user and the user state. Accordingly, the control unit 203 may select a different process depending on whether the user estimated to be in a sleepy state is a driver or a passenger, for example. When a user who is presumed to be in a drowsy state is a passenger (e.g., a child who is sleeping), if some processing (such as window opening and closing or seat vibration) is performed, a result that is contrary to the intention of the user or other user (such as a guardian) may be caused. As a result, it is difficult to provide the user with a highly satisfactory mobile experience. On the other hand, if the user who is estimated to be in a sleepy state is a passenger, the control unit 203 may reduce the possibility of causing a result that is contrary to the intention of the user by not selecting a part of the processing. That is, the control unit 203 may selectively disable some processes according to the position (driver or passenger) of each user on the vehicle 100 and the user state of the user. This makes it easier to prevent undesired processing from being executed in the vehicle 100. As a result, the user of the vehicle 100 can easily provide a highly satisfactory travel experience.

In addition, when at least one process includes talking to a user, the control unit 203 may change the utterance mode between a case where the number of users of the vehicle 100 is a single number and a case where the number of users is a plurality when talking to the user is executed in the vehicle 100. Specifically, the control unit 203 designates a different utterance mode from among the plurality of utterance modes so that the content described when the agent 104 speaks to the user is different between the case where the number of users is single and the case where the number of users is plural as the detailed function of the conversation to the user. The plurality of utterance modes can be arbitrarily set, but in the present embodiment, the mode includes a mode in which an utterance is made from the viewpoint of empathizing only a single user (hereinafter, also referred to as "empathy mode"), and a mode in which an utterance is made from the viewpoint of being neutral with respect to a plurality of users (hereinafter, also referred to as "neutral mode"). The empathy mode may be set by machine learning a conversation between one-to-one persons. The neutral mode may be set by machine learning a conversation between one-to-many persons. In the empathetic mode, a conversation of content considering only a single user (in this case, a driver) is executed. For example, only a single user may be encouraged, comforted, or relaxed depending on the results of analysis of information such as driving conditions or scenery of other vehicles surrounding the vehicle 100. On the other hand, in the neutral mode, not only the driver but also the passenger is allowed to speak. For example, when a fight is detected, a voice may be made to calm the fight. Also, when a silence state is detected over a predetermined number of consecutive aggregation periods, a topic common to each user may be provided.

As described above, the control unit 203 may designate the utterance mode as a detailed function of speaking to the user based on the number of users of the vehicle 100. When the user of the vehicle 100 is a single user, the control unit 203 transmits, to the vehicle 100, an instruction for executing a conversation with the user in the vehicle 100, together with designation of the empathy mode, in the instruction data. When there are a plurality of users of the vehicle 100, the control unit 203 transmits, to the vehicle 100, an instruction for executing a conversation with the user in the vehicle 100, together with designation of the neutral mode, in the instruction data. The control unit 113 of the vehicle 100 causes the agent 104 to perform speech in the utterance mode indicated by the received instruction data. This makes it easier for the user of the vehicle 100 to provide a highly satisfactory travel experience.

As described above, the information processing device 200 according to the present embodiment estimates the state of the user based on the user information including at least one of the voice data, the image data, and the biometric data of the user of the vehicle 100. When it is determined that the estimated state satisfies the predetermined condition, the information processing device 200 executes a predetermined process selected according to the estimated state in the vehicle 100.

According to this configuration, by estimating the state of the user of the vehicle 100, predetermined processing can be actively executed without waiting for an instruction from the user. For example, if it is estimated that the user is in a stress or drowsy state, the in-vehicle environment of the vehicle 100 may be changed so as to cancel the state, and a process of mitigating adverse effects on the steering may be actively performed. Therefore, it is possible to provide a highly satisfactory mobile experience to a user who feels insufficient in the conventional passive vehicle agent service. Therefore, the technology related to the vehicular agent system is improved in that the user experience is easily improved.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, as a modification of the present embodiment, the control unit 203 may calculate the expected arrival time to the destination by using the traveling data in addition to the user information acquired by S100. In this case, the control unit 203 may determine the execution timing of the predetermined process based on the calculated estimated arrival time. The execution timing may be any timing before the expected arrival time. For example, the control unit 203 may add, to the instruction data, information indicating a timing at which the seat vibration is executed for the seat of the user of the passenger who is estimated to be in a state of high drowsiness. Accordingly, the user can be awakened before the arrival of the destination, and the getting-off behavior after the arrival of the destination can be smoothed.

Further, for example, in the above-described embodiment, the configuration and operation of the information processing device 200 may be distributed among a plurality of computers capable of communicating with each other. Further, for example, an embodiment in which some or all of the constituent elements of the information processing device 200 are provided in the vehicle 100 is also possible. For example, the navigation device mounted on the vehicle 100 may include some or all of the components of the information processing device 200.

Further, for example, a general-purpose computer may function as the information processing device 200 according to the above-described embodiment. Specifically, a program describing processing contents for realizing each function of the information processing device 200 according to the above-described embodiment is stored in a memory of a general-purpose computer, and the program is read and executed by a processor. Therefore, the present disclosure can also be realized as a program that can be executed by the processor or a non-transitory computer-readable medium that stores the program.

What is claimed is:

1. An information processing device comprising:
a processor configured to
determine whether a state of a user of a vehicle satisfies a first predetermined condition based on user information including at least one of voice data, image data, and biometric data of the user;
identify whether the user is a driver or a passenger based on a seating position of the user in the vehicle; and
determine whether a second predetermined condition is satisfied, wherein
the processor executes a predetermined process selected based on the state in the vehicle in response to the processor identifying the driver as the user and determining that the state of the driver satisfies the first predetermined condition,
the processor does not execute the predetermined process selected based on the state in the vehicle in response to the processor identifying the passenger as the user and determining that the state of the passenger satisfies the first predetermined condition and that the second predetermined condition is satisfied, and
the processor determines that the second predetermined condition is satisfied when a difference between current time and an estimated time of arrival at a destination is equal to or greater than a predetermined time.

2. The information processing device according to claim 1, wherein the first predetermined condition is that the user is in a stressful or drowsy state.

3. The information processing device according to claim 1, wherein the processor is configured to select, as the predetermined process, at least one process from among fragrance spraying, music reproduction, air-conditioning adjustment, window opening or closing, seat vibration, and talking to the user in the vehicle.

4. The information processing device according to claim 3, wherein:
the processor is configured to select the at least one process for each of the driver and the passenger based on the state of each of the driver and the passenger.

5. The information processing device according to claim 3, wherein:
the at least one process includes the talking to the user; and
the processor is configured to, when executing the talking to the user in the vehicle, change a speech mode between a case where the number of users of the vehicle is single and a case where the number of users of the vehicle is plural.

* * * * *